US011644044B2

(12) United States Patent
Fung et al.

(10) Patent No.: US 11,644,044 B2
(45) Date of Patent: May 9, 2023

(54) SIDE-CHANNEL COMPRESSOR FOR A FUEL CELL SYSTEM FOR CONVEYING AND/OR COMPRESSING A GASEOUS MEDIA

(71) Applicant: Robert Bosch GmbH, Stuttgart (DE)

(72) Inventors: Ralph Leonard Fung, Stuttgart (DE); Alexander Hero, Lehrensteinsfeld (DE); Thomas Wieland, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 375 days.

(21) Appl. No.: 16/644,262

(22) PCT Filed: Aug. 8, 2018

(86) PCT No.: PCT/EP2018/071486
§ 371 (c)(1),
(2) Date: Mar. 4, 2020

(87) PCT Pub. No.: WO2019/048167
PCT Pub. Date: Mar. 14, 2019

(65) Prior Publication Data
US 2020/0194814 A1    Jun. 18, 2020

(30) Foreign Application Priority Data
Sep. 7, 2017    (DE) .................... 10 2017 215 731.3

(51) Int. Cl.
*F04D 29/26*    (2006.01)
*F04D 23/00*    (2006.01)
(Continued)

(52) U.S. Cl.
CPC .......... *F04D 29/26* (2013.01); *F04D 23/008* (2013.01); *F04D 29/161* (2013.01); *F04D 29/403* (2013.01); *F04D 29/706* (2013.01)

(58) Field of Classification Search
CPC .......... F04D 5/002; F04D 5/008; F04D 5/007; F04D 23/008; F04D 29/706; F04D 29/188
See application file for complete search history.

(56) References Cited

U.S. PATENT DOCUMENTS

| 6,439,833 B1 * | 8/2002 | Pickelman | F04D 29/188 415/55.1 |
| 2003/0118437 A1 * | 6/2003 | Takami | F04D 29/188 415/55.1 |
| 2011/0052378 A1 | 3/2011 | Dittmar et al. | |

FOREIGN PATENT DOCUMENTS

| DE | 19615323 A1 * | 10/1997 | ........... F04D 29/188 |
| DE | 19943261 A1 * | 3/2001 | ........... F04D 29/188 |

(Continued)

OTHER PUBLICATIONS

International Search Report for Application No. PCT/EP2018/071486 dated Oct. 19, 2018 (English Translation, 2 pages).

*Primary Examiner* — Richard A Edgar
(74) *Attorney, Agent, or Firm* — Michael Best & Friedrich LLP (57) ABSTRACT

The invention relates to a side-channel compressor (1) for a fuel cell system (37) for conveying and/or compressing a gas, particularly hydrogen, comprising a housing (3), the housing (3) comprising a housing upper part (7) and a housing lower part (8), a compressor chamber (30) located in the housing (3), comprising at least one peripheral side channel (19), a compressor wheel (2) arranged in the housing (3), which is rotatably arranged about an axis of rotation (4), the compressor wheel (2) comprising blades (5) arranged on the periphery thereof in the region of the compressor chamber (30), and respectively a gas inlet (14) embodied in the housing and a gas outlet (16) which are fluidically interconnected by means of the compressor (Continued)

chamber (30), particularly the at least one side channel (19). According to the invention, the compressor wheel (2) comprises a peripheral stop ring (11) on the periphery thereof, which extends around the compressor wheel (2) in a rotationally symmetric manner in relation to the axis of rotation (4).

22 Claims, 4 Drawing Sheets

(51) Int. Cl.
    *F04D 29/70*     (2006.01)
    *F04D 29/40*     (2006.01)
    *F04D 29/16*     (2006.01)

(56) References Cited

FOREIGN PATENT DOCUMENTS

| | | | | |
|---|---|---|---|---|
| DE | 10019908 A1 | * | 10/2001 | ........... F04D 29/188 |
| DE | 10030604 A1 | | 1/2002 | |
| DE | 10220643 A1 | * | 12/2002 | ........... F04D 29/188 |
| DE | 102005008388 | | 8/2006 | |
| DE | 102007053016 | | 5/2009 | |
| DE | 102007053017 | | 5/2009 | |
| DE | 102009021642 A1 | * | 11/2010 | ........... F04D 17/168 |
| DE | 102014106440 | | 11/2015 | |
| DE | 102015000264 A1 | | 7/2016 | |
| DE | 102015111469 A1 | | 1/2017 | |
| DE | 102015224223 A1 | | 6/2017 | |
| EP | 1491227 | | 12/2004 | |
| EP | 3199817 A1 | | 8/2017 | |
| JP | H0481595 A | | 3/1992 | |
| JP | H09511812 A | | 11/1997 | |
| JP | 2002266785 A | | 9/2002 | |
| JP | 2002544428 A | | 12/2002 | |
| JP | 2003193992 A | | 7/2003 | |
| JP | 2008069681 A | | 3/2008 | |
| JP | 2010265895 A | | 11/2010 | |
| JP | 2017096173 A | * | 6/2017 | ........... F04D 29/188 |
| WO | WO-9210680 A1 | * | 6/1992 | ........... F04D 29/188 |
| WO | WO-0047899 A1 | * | 8/2000 | ........... F04D 29/188 |
| WO | WO-2017009065 A1 | * | 1/2017 | ........... F04D 23/008 |
| WO | 2017090510 A1 | | 6/2017 | |

* cited by examiner

SIDE-CHANNEL COMPRESSOR FOR A FUEL CELL SYSTEM FOR CONVEYING AND/OR COMPRESSING A GASEOUS MEDIA

BACKGROUND OF THE INVENTION

The present invention relates to a side-channel compressor for a fuel cell system for conveying and/or compressing a gaseous medium, in particular hydrogen, which is provided in particular for use in fuel cell powered vehicles.

Besides liquid fuels, gaseous fuels will also become increasingly important in the automotive sector in future. Hydrogen gas flows have to be controlled in particular in the case of fuel cell powered vehicles. The gas flows herein are no longer discontinuously controlled, as is the case when injecting liquid fuel, but the gas is retrieved from at least one high-pressure tank and by way of a supply line of a medium-pressure line system is dissipated to an ejector unit. Said ejector unit by way of a connecting line of a low-pressure line system guides said gas to a fuel cell. Once the gas has flowed through the fuel cell, said gas by way of a return line is guided back to the ejector unit. The side-channel compressor which in terms of fluid control and efficiency technology facilitates the return of the gas can intervene herein. Moreover, side-channel compressors are used for facilitating the build-up of a flow in the fuel-cell drive system, in particular when (cold) starting the vehicle after having been stationary for a certain time. Driving said side-channel compressors usually takes place by way of electric motors which when operating in vehicles are supplied with voltage by way of the vehicle battery.

A side-channel compressor for a fuel cell system in which a gaseous medium is conveyed and/or compressed is known from DE 10 2007 053 016 A1. The side-channel compressor has a compressor wheel which revolves in a housing and which is fastened to a drive shaft and is set in rotation by a drive. The compressor wheel herein has an inner delimitation ring which in an encircling manner runs about a rotation axis. Blades are situated in the region of a compressor chamber on said compressor wheel, conveyor cells being in each case configured between said blades. The blades interact with a side channel which is configured so as to be annular and encircle the rotation axis. The blades herein are configured so as to be flat, and a blade contour runs in a planar manner in the direction of the rotation axis. A circulating flow is configured between the blade and the side channel when the compressor wheel rotates in the housing, energy being introduced from the compressor wheel to the gaseous medium on account thereof. The gaseous medium herein flows axially, in the direction of the rotation axis, into the inner region of the conveyor cell that faces the inner delimitation ring, and exits in an axial manner in the direction of the rotation axis in the region of the outer region of the conveyor cell that faces away from the inner delimitation ring. The gaseous medium when flowing through the conveyor cell of the blade is imparted a change in terms of spin, a pressure increase in the encircling side channel being caused on account thereof.

The side-channel compressor known from DE 10 2007 053 016 A1 can have specific disadvantages. Unfavorable flow conditions are present in the configuration of the conveyor cell having blades which are disposed so as to be orthogonal to a flow direction and which have in particular a planar contour that runs in the direction of the rotation axis. This disadvantage arises in the conveying of the gaseous medium, in particular when the gaseous medium flows into and out of the conveyor cell, wherein the conveying pressure and the efficiency factor attainable in particular by way of this side-channel compressor are low. The side-channel compressor known from DE 10 2007 053 016 A1 furthermore offers the disadvantages that a relative movement and a relative velocity between a surface of the housing and a surface of the compressor wheel situated in the housing is created when the compressor wheel in the operation of the side-channel compressor rotates about the rotation axis in the housing, wherein the rotation of the compressor wheel is caused by the drive. A medium situated in the side-channel compressor is set in motion, conveyed through the side-channel compressor and ideally compressed on account of the rotation of compressor wheel. The surface of the stationary housing herein can cause a deceleration of the flow of the gaseous medium, in particular of the circulating flow, and increased friction arises between the housing and the gaseous medium, in particular in a gaseous medium which in a radial manner to the rotation axis flows outward from the compressor wheel. This effect is moreover reinforced by the effects of centrifugal force by virtue of the mass of the gaseous medium, since a conveyed gaseous medium on account of the centrifugal force always urges radially outward in a reinforced manner in the direction of the rotation axis rather than flowing in an axial manner to the rotation axis, when the compressor wheel is in rotation. The flow rate of the gaseous medium is reduced by virtue of the increased friction between the gaseous medium and the housing, in particular in a radial manner to the rotation axis, and the temperature of the gaseous medium can increase on account of said friction, this in turn counteracting an optimal compression. This effect furthermore leads to a reduced conveying pressure and to a reduced efficiency factor.

SUMMARY OF THE INVENTION

Proposed according to the invention is a side-channel compressor for a fuel cell system, for conveying and/or compressing a gaseous medium, in particular hydrogen.

According to the invention, the side-channel compressor is configured in such a manner that a compressor wheel on the circumference thereof has an encircling outer delimitation ring which runs about a compressor wheel so as to be rotationally symmetrical to a rotation axis. Leakage flows which from the compressor wheel run radially outward from the rotation axis can be prevented in this way. On account of the design embodiment of the side-channel compressor according to the invention in the form of the outer delimitation ring encircling the circumference of the compressor wheel, it can furthermore be prevented that the gaseous medium in a radial manner to the rotation axis flows from the compressor wheel away to a housing, and contact between the gaseous medium and the housing in this direction is thus now prevented. This offers the advantages that an optimal flow rate of the gaseous medium can be maintained, the temperature of the gaseous medium is not increased, and an optimal conveying pressure is maintained. On account thereof, improved conveying and compressing of the gaseous medium in the side-channel compressor can be achieved, and the efficiency factor of the side-channel compressor can be increased. Finally, a drive, in particular an electric drive, will require less energy, in particular from the system of the vehicle, in comparison to the conveyed quantity of the gaseous medium. The noise pollution from the operation of the side-channel compressor can also be reduced.

Advantageous refinements of the pump according to the invention are possible on account of the measures set forth in the dependent claims. The dependent claims relate to preferred refinements of the invention.

According to one particularly advantageous design embodiment, the compressor wheel in the region of a compressor chamber between in each case two neighboring blades configures in each case one conveyor cell. Said conveyor cell in a radial manner to the rotation axis is outwardly delimited by the outer delimitation ring and is inwardly delimited by an encircling inner delimitation ring of the compressor wheel. The conveyor cell herein in the direction of the rotation axis has at least one opening. The outer delimitation ring and the inner delimitation ring herein run so as to be rotationally symmetrical to the rotation axis. Furthermore, the at least one opening is configured on that side of the conveyor cell of the compressor wheel that faces the at least one side channel of the housing. It can be achieved in this way that the flow of the gaseous medium, in particular a circulating flow, flows only in an axial manner to the rotation axis and from the conveyor cell, only an axial movement of the gaseous medium between the at least one side channel and the conveyor cell thus being established. This offers the advantage that a flow of the gaseous medium is established only in the region in which said flow is desired, specifically between the side channel compressor and the conveyor cell. Frictional losses by virtue of friction between the medium and other regions of the side-channel compressor which do not cause improved conveying and compressing of the gaseous medium can be largely reduced and/or avoided, on account of which the efficiency factor of the side-channel compressor can be increased. An undesirable increase in the temperature of the gaseous medium by virtue of undesirable friction does also not arise.

According to one advantageous design embodiment, at least two blades on that side of the outer delimitation ring that faces the rotation axis have a guide contour which in the cross section converges so as to form a tip, and/or on that side of the inner delimitation ring that faces away from the rotation axis have a second guide contour which in the cross section converges so as to form a tip. The first symmetry axis herein runs through the respective tips of the two guide contours. In this way, the gaseous medium that in an axial manner to the rotation axis flows from the at least one side channel through the at least one opening into the conveyor cell can be better set in the desired direction and to the desired state of the circulating flow, on account of which the conveying effect of the side-channel compressor can be improved. The conveying pressure in the compressor chamber is increased and the efficiency factor of the side-channel compressor can be improved on account thereof.

According to one advantageous refinement, at least two blades have in each case one V-shaped contour. The V-shaped contour herein between two openings runs in the direction of the rotation axis. The opened side of the symmetrical V-shaped contour herein is directed in a rotation direction of the compressor wheel. In this way, the achievable conveying pressure can be increased, and the fluidic efficiency factor of the compressor wheel in the region of the conveyor cell can be improved on account of the V-shaped contour, on account of which the overall efficiency factor of the side-channel compressor can be increased. This is possible by virtue of the end or the ends of the blades in the region of the at least one opening of the conveyor cell being disposed so as to be inclined forward in the rotating direction and/or so as to be leading in the rotating direction. An improved flow condition can be achieved on account thereof, since an inflow of the conveyed gaseous medium into the conveyor cell in an approximately parallel manner can be achieved on account thereof, this offering fluidic advantages. Furthermore, an improved circulating flow profile can be achieved on account of a such V-shaped contour of the blades.

According to one advantageous design embodiment, at least one chamfer is in each case configured on the rear sides of the at least two blades that face away from the rotation direction. The chamfer herein runs in particular on the end of the respective blade that faces the at least one opening. An improved flow behavior of the circulating flow in the operation of the side-channel is achieved in this way, in particular during the rotation of the compressor wheel and a movement of the conveyor cells and of the V-shaped blades relative to the at least one side channel. It is furthermore prevented on account of the at least one chamfer that a breakdown of the flow on the rear sides of the at least two blades that point counter to the rotation direction of the compressor wheel arises, on account of which a formation of turbulences which is associated therewith and is disadvantageous to the circulating flow is prevented. On account thereof, an increase in the efficiency of the circulating flow can be achieved, the latter being the root cause in terms of the efficiency of the transmission of energy between the blades of the compressor wheel and the at least one encircling side channel.

According to one particularly advantageous design embodiment, the compressor wheel on the outer delimitation ring has at least one outside encircling annular bead which runs in particular in a radial manner to the rotation axis. The outside annular bead herein runs on that side of the outer delimitation ring that faces away from the rotation axis. Furthermore, the at least one outside encircling annular bead in an axial manner and/or radial manner to the rotation axis also bears on the housing upper part and/or the housing lower part. The advantage that an encapsulation of the at least one side channel and/or of the conveyor cell in relation to an outer region, in particular in the housing, takes place can be achieved in this way, on the one hand. On the other hand, the advantage that improved guiding of the compressor wheel in the housing takes place on account of the at least one outside encircling annular bead which in an axial manner and/or radial manner to the first symmetry axis bears on the housing upper part and/or the housing lower part can be achieved. It is furthermore achieved on account thereof that fewer longitudinal and transverse forces arise during the operation of the side-channel compressor, and thus fewer damaging impulse forces such as, for example, shocks arise on the compressor wheel, the housing, the bearings, and the drive. The service life of the entire side-channel compressor can be increased on account thereof. Furthermore, noise emissions from the operation of the side-channel compressor can be improved by virtue of the improved guiding of the compressor wheel by means of the outside encircling annular bead.

According to one advantageous design embodiment, the compressor wheel on the inner delimitation ring has at least one inside encircling annular bead which runs in particular in a radial manner to the rotation axis and which runs on that side of the inner delimitation ring that faces the rotation axis. Furthermore, the at least one inside annular bead in an axial manner and/or radial manner to the rotation axis bears on the housing upper part and/or the housing lower part. In this way, the advantage that the compressor wheel is better guided in the housing can be achieved. Furthermore, fewer longitudinal and transverse forces will arise during the operation of the side-channel compressor, and thus fewer damaging impulse forces such as, for example, shocks will arise on the compressor wheel, the housing, the bearings, and the drive, on account thereof. The service life of the entire side-channel compressor can be increased on account thereof. Furthermore, noise emissions from the operation of the side-channel compressor can be improved by virtue of the improved guiding of the compressor wheel by means of the outside encircling annular bead.

According to one advantageous design embodiment, an at least partially encapsulated separation chamber is configured on that side of the encircling outer delimitation ring that faces away from the rotation axis, wherein the separation chamber is in particular situated in a radial manner to the rotation axis, between the outer delimitation ring and the housing upper part and/or the housing lower part, and runs so as to at least partially encircle the rotation axis between the housing and the outer delimitation ring. In the event of heavy component parts being formed in the gaseous medium, wherein the heavy component parts are in particular liquid water and/or water vapor and/or nitrogen, it is possible in this way for said heavy parts to be able to be discharged from the region of the conveyor cell and/or the at least one side channel into the separation chamber. The discharge of the heavy component part or parts herein takes place by way of the centrifugal force which is exerted on the gaseous medium on account of the rotation of the compressor wheel, the heavy component parts on account of said centrifugal force moving from the region of the at least one side channel in a discharge direction away from the rotation axis, between the housing and the outside encircling annular bead, through to the encapsulated separation chamber. On account thereof, the heavy component parts can be guided out of the region of the at least one side channel and/or of the conveyor cell. The advantages that damage, in particular on account of corrosion, to the surfaces of the side channel and/or the conveyor cell by the heavy component parts is prevented can on account thereof be achieved, this leading to an increased service life of the entire side-channel compressor. The design embodiment of the side-channel compressor according to the invention furthermore offers the advantage that the efficiency and the efficiency factor of the fuel cell system can be increased since the undesirable heavy component parts, which are in particular not hydrogen and which do not contribute toward generating power in the fuel cell system, are discharged from the system, on the one hand. The efficiency factor of the fuel cell system can be increased on account thereof. Furthermore, the efficiency and the efficiency factor of the side-channel compressor can be increased since the heavy component parts, in particular liquid water and/or water vapor and/or nitrogen, mean a higher input of energy when conveyed and/or compressed by the side-channel compressor, in particular in comparison with hydrogen, in particular when starting the side-channel compressor. The advantage that by directing the heavy component parts such as liquid water in particular from the region of the compressor chamber, so-called ice bridges are prevented from forming between the movable parts, in particular the compressor wheel and the housing, in the switched-off state of the fuel cell system and at low ambient temperatures, is furthermore achieved. Ice bridges of this type would impede or completely prevent starting of the fuel cell system, in particular of the side-channel compressor. Damage to the rotating parts of the of the side-channel compressor and/or of a drive, in particular an electric drive, by virtue of the formation of ice bridges can thus be prevented on account of the design embodiment of the side-channel compressor according to the invention. This leads to a higher degree of reliability of the fuel cell system and/or of the vehicle. A further advantage according to the design embodiment of the side-channel compressor according to the invention is a continuous dissipation of the heavy component part nitrogen, in particular from the region of the compressor chamber into the separation chamber, a purge valve which would otherwise be required in the fuel cell system not longer being necessary. This function would comprise blowing off nitrogen from the fuel cell system by means of said purge valve, a proportion of hydrogen also being lost in the activation of said purge valve, this being disadvantageous in terms of the operation of the fuel cell system and increasing the hydrogen consumption of the fuel cell system. A loss of hydrogen from the fuel cell system can thus be prevented and the hydrogen consumption can thus be reduced by means of the design embodiment of the side-channel compressor according to the invention and the continuous dissipation of the heavy component nitrogen.

According to one particularly advantageous design embodiment, a discharge channel is situated on that side of the encapsulated separation chamber that faces away from the rotation axis in the housing upper part and/or in the housing lower part and/or between the housing upper part and the housing lower part. The discharge channel herein is situated at the lowest point in the housing upper part and/or in the housing lower part and/or between the housing upper part and the housing lower part, in particular in the acting direction of gravity. The advantage that the heavy component parts which have been discharged from the compressor chamber of the side-channel compressor into the separation chamber are further discharged from the housing of the side-channel compressor and the fuel cell system can be achieved in this way, on account of which it is prevented that a follow-on flow of the heavy components into the separation chamber is prevented since the volume of the separation chamber is completely filled, which in turn would prevent the heavy components being able to continue being discharged from the separation chamber. This offers the advantage that an increase in the efficiency factor of the side-channel compressor and/or of the fuel cell system can be maintained over the entire service life.

On account of the configuration of the discharge channel at the lowest point in the housing upper part and/or in the housing lower part and/or between the housing upper part and the housing lower part, the advantage that the heavy components can be discharged from the side-channel compressor by gravity, without any further input of energy, in particular without any further input of energy of the drive, can be achieved. This offers the advantage that an increase in terms of the service life and of the efficiency factor of the side-channel compressor can be achieved without any further input of energy and thus operating costs.

According to one advantageous design embodiment, an at least partially encapsulated region is configured on that side of the inner delimitation ring that faces the rotation axis, wherein the at least one encapsulated region is in particular situated between the at least one inside annular bead and the housing upper part and/or the housing lower part. It is prevented in this way that neither hydrogen nor the heavy component parts from the region of the compressor chamber further invade the inside encapsulated region of the side-channel compressor in which components which can be damaged by hydrogen and/or by the heavy component parts are situated. The service life of the bearings of a drive shaft can thus be increased, for example, since damage, in particular on account of corrosion by contact with water, is prevented by the encapsulation of the inside region. Furthermore prevented is electrical shorting on account of ingress of liquid into the electrical components, since all electrical components, such as for example the drive, are situated in the inside encapsulated region of the side-channel compressor and are thus protected against liquid. The probability of a breakdown of the side-channel compressor is reduced, and the service life of the fuel cell system can be increased, on account thereof.

BRIEF DESCRIPTION OF THE DRAWINGS

The invention will be described in more detail below by means of the drawings.

In the drawings.

DETAILED DESCRIPTION

Figure 1:
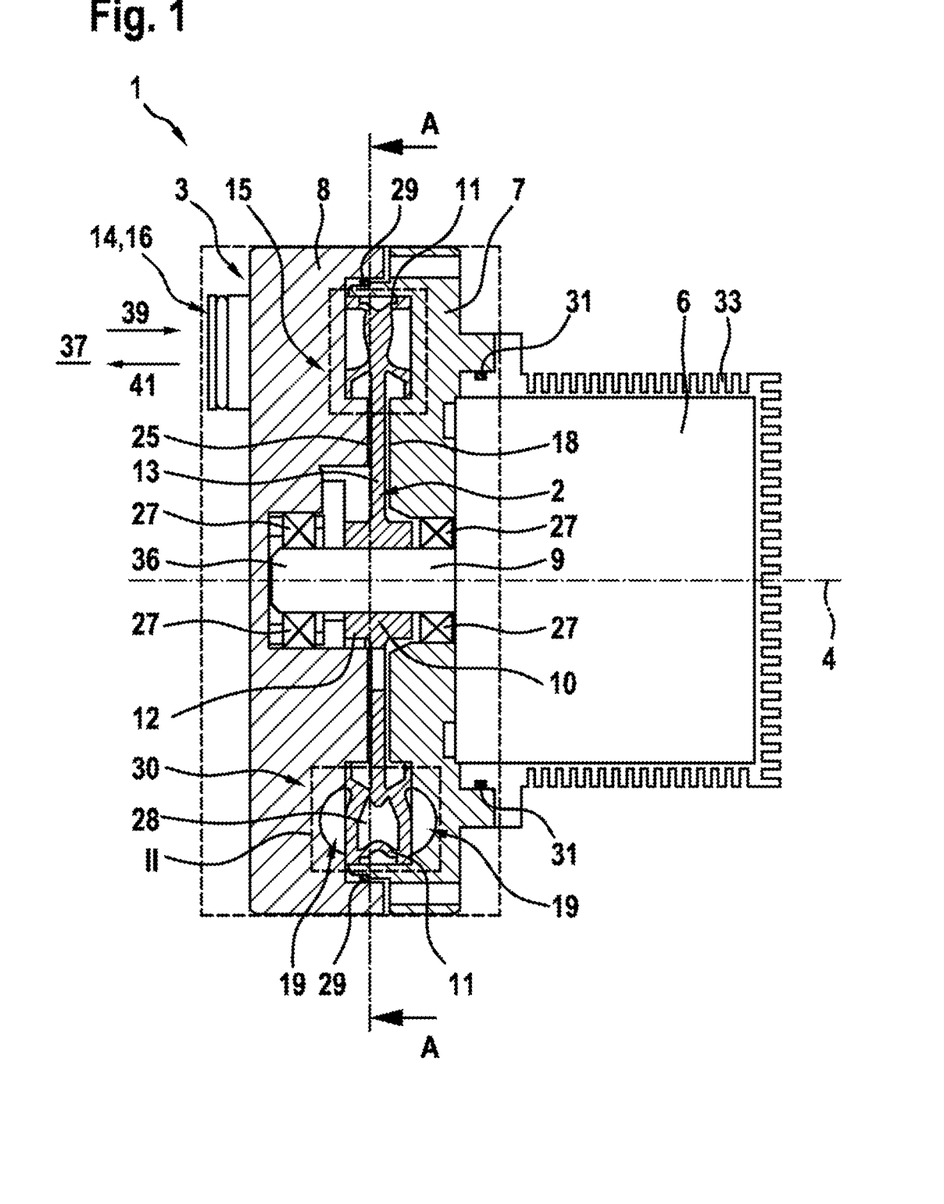
FIG. 1 shows a schematic sectional view of a side-channel compressor according to the invention.

A longitudinal section through a side-channel compressor 1 can be derived from the illustration according to FIG. 1, said side-channel compressor 1 being proposed according to the invention and configured so as to be rotationally symmetrical to a rotation axis 4.

The side-channel compressor 1 herein has a compressor wheel 2 which is in particular configured as a closed disk-type compressor wheel 2 and is mounted in the housing 3 so as to be rotatable about the horizontally running rotation axis 4. The drive 6, in particular an electric drive 6, herein serves as a rotary drive 6 of the compressor wheel 2. The housing 3 comprises a housing upper part 7 and a housing lower part 8 which are connected to one another, wherein a first sealing element 29, in particular an O-ring, that encircles the rotation axis 4 is disposed between the housing upper part 7 and the housing lower part 8. The first sealing element 29 herein effects an encapsulation of the internal chamber, in particular of a compressor chamber 30 of the side-channel compressor 1. The compressor wheel 2 is disposed so as to be rotationally fixed on a drive shaft 9 and is enclosed by the housing upper part 7 and the housing lower part 8. The compressor wheel 2 has an inner compressor wheel hub 10, wherein the compressor wheel hub 10 has a clearance through which the drive shaft 9 is push-fitted, and wherein the compressor wheel hub 10 is in particular connected to the drive shaft 9 by way of a press-fit. Moreover, the compressor wheel hub 10 on that side that faces away from the rotation axis 4 is delimited in an encircling manner by a hub base 12. The compressor wheel 2, from the hub base 12 in an outward manner away from the rotation axis 4, configures an encircling circular hub disk 13. The compressor wheel 2 furthermore configures a conveyor cell 28 which adjoins the hub disk 13 on the external side. Said conveyor cell 28 of the compressor wheel 2 in the encircling compressor chamber 30 of the housing 3 runs in an encircling manner about the rotation axis 4, wherein the compressor wheel 2 and/or the conveyor cell 28 on the respective outside circumference have/has an encircling outer delimitation ring 11, wherein the outer delimitation ring 11 delimits in particular the conveyor cell 28 on the external diameter of the latter that encircles the rotation axis 4. The housing 3, in particular the housing upper part 7 and/or the housing lower part 8, in the region of the compressor chamber 30 furthermore has/have at least one encircling side channel 19. The side channel 19 in the housing 3 herein runs in the direction of the rotation axis 4 in such a manner that said side channel 19 runs on one side or both sides in an axial manner to the conveyor cell 28. The side channel 19 at least in a sub-region of the housing 3 herein can run in an encircling manner about the rotation axis 4, wherein an intervening region 15 in the housing 3 is configured in the sub-region in which the side channel 19 is not configured in the housing 3 (see FIG. 2).

The drive shaft 9 by way of one end, in an axial manner to the rotation axis 4, is connected to the drive 6 at least in cardanic terms. A bearing 27 herein is situated on the external diameter of the drive shaft 9, so as to be axially in the region between the drive 6 and the compressor wheel 2, in particular between the drive 6 and the hub base 12 of the compressor wheel 2. The drive shaft 9 on the side thereof that faces away from the drive 6, in an axial manner to the rotation axis 4, configures a bearing journal 36, wherein a further bearing 27 is situated in the region of the bearing journal 36. The drive shaft 9, proceeding from the external diameter region thereof, in one potential embodiment has shoulders which in the axial direction run toward both shaft ends, the compressor wheel 2 being attached to said shoulders. The diameter of the drive shaft 9 in the region between the respective shoulder and the respective shaft end is in particular reduced in size in comparison with the larger shaft diameter region in which the drive shaft 9 is connected to the compressor wheel 2. The bearings 27 can be roller bearings 27, in particular ball bearings 27.

The drive 6 on the surface thereof can have cooling ribs 33 which have the effect of an improved discharge of thermal energy to the environment. Heat in the drive 6 arises in such a manner that excess thermal energy which is present in particular as friction heat or inductive magnetic heat is created on account of the driving of the compressor wheel 2. Said heat, by virtue of the cooling ribs 33 of the drive 6, can be discharged more rapidly to the environment, since the drive on account of the cooling ribs has an enlarged surface. The drive 6 is connected to the housing 3 of the side-channel compressor 1, in particular to the housing upper part 7, in that the drive 6 by way of at least one end face, in an axial manner to the rotation axis 4, bears on an end face of the housing 3. The drive 6 when being assembled on the housing 3 is centered in such a manner that an external diameter region of the drive 6 bears, in particular in a radial manner to the rotation axis 4, on an internal diameter region of the housing 3. A second encircling sealing element 31, in particular an O-ring, which effects an encapsulation of the internal chamber of the side-channel compressor 1 and/or of the drive 6, in particular in relation to contamination or moisture from outside, can be attached between the external diameter region of the drive 6 and the internal diameter region of the housing 3.

Moreover, the housing 3 configures a first side wall 18 and a second side wall 25, the hub disk 13 of the compressor wheel 2 being situated therebetween in an axial manner to the rotation axis 4. The first side wall 18 herein is in particular situated in the housing upper part 7, and the second side wall 25 is situated in the housing lower part 8. Furthermore, the housing 3, in particular the housing lower part 8, configures a gas inlet opening 14 and a gas outlet opening 16. The gas inlet opening 14 and the gas outlet opening 16 are fluidically connected to one another in particular by way of the at least one side channel 19.

A torque is transmitted from the drive 6 to the compressor wheel 2 by way of the compressor wheel hub 10. The compressor wheel 2 herein is set in rotating motion, and the conveyor cell 28 in a rotating movement in an encircling manner about the rotation axis 4 moves in a flow direction 26 through the compressor chamber 30 in the housing 3 (see FIG. 2). A gaseous medium already situated in the compressor chamber 30 herein is entrained by the conveyor cell 28 and is conveyed and/or compressed herein. Moreover, a movement of the gaseous medium, in particular a fluidic exchange, takes place between the conveyor cell 28 and the at least one side channel 19.

The gaseous medium, which is in particular a non-consumed recirculation medium from a fuel cell 39, by way of the gas inlet opening 14 is furthermore fed into the compressor chamber 30 of the side-channel compressor 1, and/or is fed to the side-channel compressor 1, and/or is suctioned from the region which is disposed upstream of the gas inlet opening 14. The gaseous medium herein upon passing through is dissipated away through the gas outlet opening 16 of the side-channel compressor 1 and flows in particular to a jet pump 41 of the fuel cell system 37.

Figure 2:
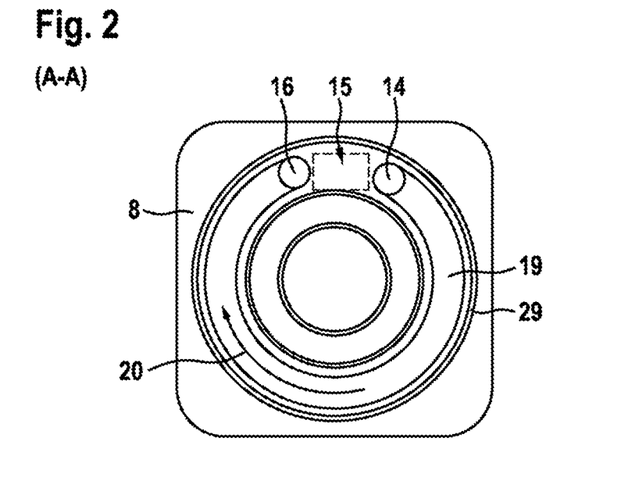
FIG. 2 shows a section of the side-channel compressor in an enlarged illustration, said section being identified by A-A in FIG. 1.

FIG. 2 shows a section of the side-channel compressor 1 in an enlarged illustration, said section being identified by A-A in FIG. 1, in which the housing lower part 8, the gas inlet opening 14, the gas outlet opening 16, an intervening region 15, the side channel 19, a rotation direction 20 (of the compressor wheel 2 not illustrated), and the first encircling sealing element 29 are illustrated.

As is illustrated in FIG. 2, the intervening region 15 is situated in the housing 3, in particular between the gas inlet opening 14 and the gas outlet opening 16, so as to encircle the rotation axis 4. The gaseous medium is conveyed through the compressor wheel 2 and/or herein flows from the gas inlet opening 14 to the gas outlet opening 16 and herein, at least partially, flows through the side channel 19. The compression and/or the pressure and/or the flow rate of the gaseous medium in the conveyor cell, in particular in the conveyor cell 28 of the compressor wheel 2 and in the side channels 19, herein increases as the circulation progresses in the rotation direction 20 from the gas inlet opening 14 to the gas outlet opening 16. A separation of a pressure side in relation to a suction side is effected by the intervening region 15, wherein the suction side is situated in the region of the gas inlet opening 14, and the pressure side is situated in the region of the gas outlet opening 16.

Figure 3:
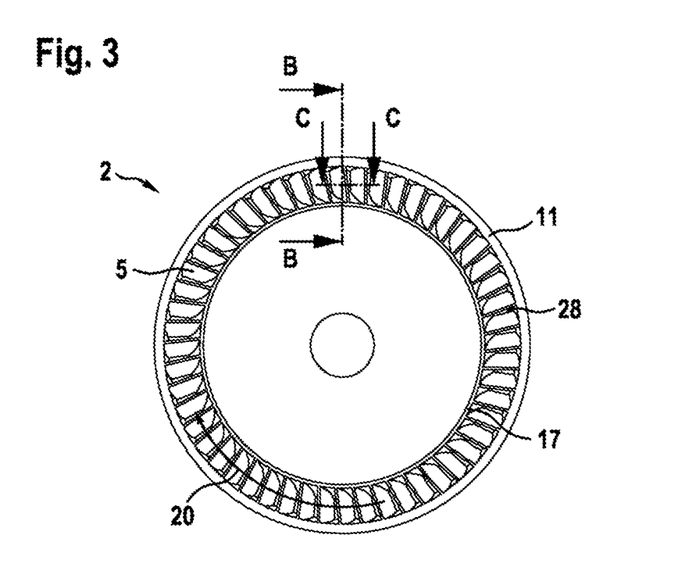
FIG. 3 shows a lateral view of a closed compressor wheel having V-shaped blades and conveyor cells.

A lateral view of the closed compressor wheel 2 having V-shaped blades 5 and conveyor cells 28 is shown in FIG. 3. The compressor wheel 2 herein has an inner delimitation ring 17 which in a radially inward manner delimits the region of the conveyor cells 28. The compressor wheel 2 moreover has an encircling outer delimitation ring 11 which in a radially outward manner delimits the region of the conveyor cells 28. The inner delimitation ring 17 and the outer delimitation ring 11 herein run about the compressor wheel 2 so as to be rotationally symmetrical to the rotation axis 4.

The compressor wheel 2 in the exemplary embodiment of the side-channel compressor 1 shown has a multiplicity of V-shaped blades 5, wherein two V-shaped blades 5 in the rotation direction 20 delimit in each case one conveyor cell 28. The blades 5 herein in the region of the inner delimitation ring 17 in the rotation direction 20 have a leading contour, and in the region of the outer delimitation ring 11 in the rotation direction 20 have a recessed contour.

Figure 4:
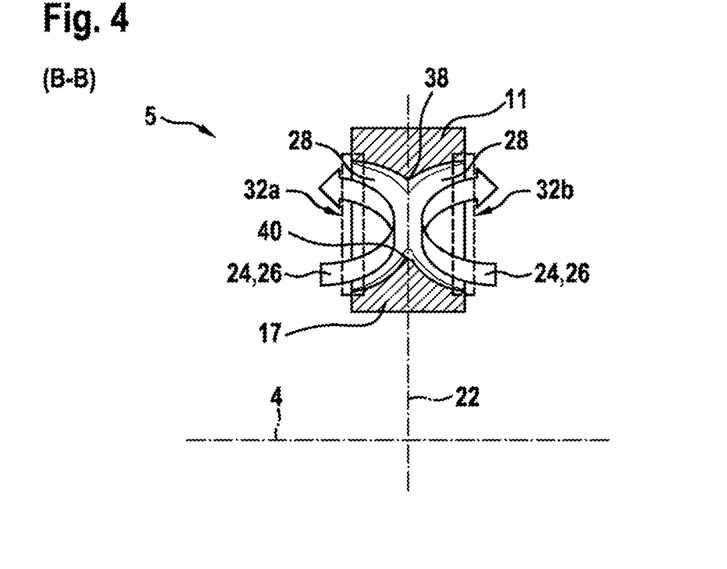
FIG. 4 shows a section of the compressor wheel and of the conveyor cell, said section being identified by B-B in FIG. 3, having a first guide contour that converges so as to form a tip and a second guide contour that converges so as to form a tip.

FIG. 4 shows a section of the compressor wheel 2, in particular of the V-shaped blade 5 and of the conveyor cell 28, said section being identified by B-B in FIG. 3, having a first guide contour 38 that converges so as to form a tip and a second guide contour that converges so as to form a tip 40. It is illustrated herein that the outer delimitation ring 11 configures the first guide contour 38 in the direction of a first symmetry axis 22 in such a manner that the first guide contour 38 from the outer delimitation ring 11 faces toward the rotation axis 4. Furthermore, the compressor wheel 2 configures the second guide contour 40 in the direction of the first symmetry axis 22 on that side of the inner delimitation ring 17 that faces away from the rotation axis 4. The compressor wheel 2 configures the second guide contour 38 in the direction of the symmetry axis 22 on that side of the outer delimitation ring 11 that faces the rotation axis 4. Both guide contours 38, 40 herein converge so as to form a tip in the region of the first symmetry axis 22. The first symmetry axis 22 herein runs through the two guide contours 38, 40, and runs centrically through the geometry of the V-shaped blade 5.

The V-shaped blade 5 moreover has at least one opening 32 of the conveyor cell 28, wherein two openings 32*a, b* are shown in the exemplary embodiment of the side-channel compressor 1 shown in FIG. 4. The conveyor cell 28 herein has the two openings 32*a, b* in a radial manner in relation to the first symmetry axis 22. Furthermore shown is the flow direction 26 of the gaseous medium through the conveyor cell 28. The gaseous medium, in particular from the region of the side channel 19, herein flows through the respective opening 32*a, b* into the conveyor cell 28. The gaseous medium herein, in the lower region on that side of the conveyor cell 28 that faces the inner delimitation ring 17, flows in in an axial manner to the rotation axis 4 toward the second guide contour 40. On account of the second guide contour 40 that converges so as to form a tip, the gaseous medium is deflected in the direction of the first symmetry axis 22 toward the outer delimitation ring 11, and emanating from the direction of the inner delimitation ring 17 flows in the direction of the first symmetry axis 22 toward the outer delimitation ring 11. The gaseous medium upon flowing through a sub-region of the conveyor cell 28 meets the first guide contour 38 that converges so as to form a tip, wherein the gaseous medium is deflected in the direction of the opening 32*a, b* and in an axial manner to the rotation axis 4 flows out of the conveyor cell 28, in particular into the region of the side channel 19. The gaseous medium herein is set in motion in a circulating flow 26 which runs in the plane illustrated in FIG. 4, on the one hand, wherein the plane is in particular defined by the rotation axis 4 and the first symmetry axis 22. On account of the further geometric shaping of the V-shaped blade 5 emanating from the plane and in the rotation direction 20, and of the encircling movement of the compressor wheel 2 about the rotation axis 4, the gaseous medium is however additionally set in motion in a plane that is orthogonal to the plane illustrated in FIG. 4, wherein the circulating flow 24 in the direction of the rotation axis 4, the first symmetry axis 22, and a second symmetry axis 50 (illustrated in FIG. 5) is created.

On account of the contour of the blade 5 embodied in a V-shaped manner, an increased variation in the spin of the flow of the gaseous medium can be achieved, on account of which the conveying and compressing effect of the side-channel compressor 1 by virtue of the circulating flow 24 between the side channel 19 and the blades 5 can be further increased and the overall efficiency factor can thus be increased.

Figure 5:
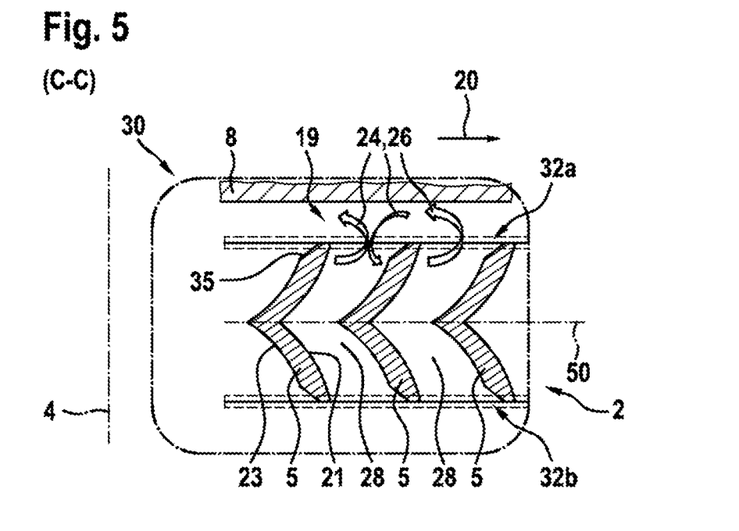
FIG. 5 shows a section of the compressor wheel and of the conveyor cells, said section being identified by C-C in FIG. 3, having an illustration of a blade geometry and a circulating flow in a side channel.

FIG. 5 shows a section of the compressor wheel 2 and of the conveyor cells 28, in particular of the blades 5, said section being identified by C-C in FIG. 3, having an illustration of a blade geometry and a circulating flow 24 in the side channel 19 and a region of the conveyor cell 28, wherein the compressor chamber 30 here is illustrated in a plan view. It is shown herein that the blades 5 in the rotation direction 20 have in each case a symmetrical V-shaped contour, wherein the symmetrical V-shaped contour of the blades 5 between two openings 32a, b runs in the direction of the rotation axis 4, and wherein the opened side of the symmetrical V-shaped contour is directed in the rotation direction 20 of the compressor wheel 2. The symmetry of the V-shaped contour of the blades 5 herein is mirror symmetrical to the second symmetry axis 50, wherein the second symmetry axis 50 runs so as to be parallel with the rotation direction 20 of the compressor wheel 2 and orthogonal to the rotation axis 4. It is moreover illustrated that the side channel 19 in a radial manner to the second symmetry axis 50 is delimited by the housing lower part 8, on the one hand, and is delimited by the opening 32a of the conveyor cell 28 of the compressor wheel 2, on the other hand. The guide contours 38, 40 described in FIG. 4 by way of the respective tip thereof run on said second symmetry axis 50, but said guide contours 38, 40 cannot be seen/illustrated by virtue of the perspective illustration of FIG. 5.

As soon as the compressor wheel 2 by means of the drive 6 from a stationary position is set in rotating motion in the rotation direction 20, a respective end side 21 of the blades 5 pushes the gaseous medium, in particular hydrogen, which is situated in the conveyor cell 28 from the region of the gas inlet opening 14 in the rotation direction 20 to the region of the gas outlet opening 16, wherein an acceleration and/or compression of the gaseous medium takes place. The gaseous medium herein by way of the end side 21 of the respective blade 5 is pushed forward in the direction of the rotation direction 20, on the one hand, and on account of the geometry of the two guide contours 38, 40 is pushed away from the second symmetry axis 50, on the other hand. The gaseous medium from the conveyor cell 28 by the second symmetry axis 50 herein is pushed in the rotation direction 20 into the respective side channel 19, wherein the gaseous medium is set in motion in the circulating flow 24, and wherein the gaseous medium flowing at a velocity out of the conveyor cell 28 in the side channel 19 meets a gaseous medium that flows at a slower rate, in particular in the rotation direction 20. This side-channel flow of the medium flows at a slower rate, in particular in the rotation direction 20, than the conveyor cell flow of the medium, in particular in the rotation direction 20, wherein, by virtue of the resulting centrifugal force differential, a force which acts from the medium in the conveyor cell 28 on the medium in the side channel 19 results. A momentum exchange between the two media takes place herein, and energy on account of the gaseous medium set in motion in a circulating flow 26 is transferred to a conveyor flow on account of a momentum exchange, said conveyed flow being in particular the stationary gaseous medium situated in the side channel 19. The conversion of velocity energy to pressure energy takes place herein. The transfer of energy herein takes place multiple times on the entire length of the encircling side channel 19, and is a function of the number of blades 5 and conveyor cells 28. A large transfer of energy between the gaseous medium situated in the conveyor cell 28 and the gaseous medium situated in the side channel 19 is thus possible, and a build-up of pressure takes place in a linear manner by a momentum exchange across the circumference. This effect of energy transmission and side-channel compression can be increased by the encircling delimitation ring 11 illustrated in FIG. 4, and the efficiency factor of the entire side-channel compressor 1 can be improved since it is now prevented that a majority of the gaseous medium in a radial manner to the rotation axis 4 flows from the conveyor cells 28 to a part of the housing 3 in which no side channel 19 is configured, and energy of the circulating flow 24 is thus lost since the gaseous medium in this region not situated in the side channel 19 conjointly with the housing 3 generates only frictional and thermal losses. Said losses can be completely prevented by the embodiment of the side-channel compressor 1 according to the invention, having the outer delimitation ring 11 (see FIG. 4), on account of which the efficiency factor and the conveying efficiency of the side-channel compressor 1 can be increased.

It is furthermore shown that at least one chamfer 35 is in each case configured on a rear side 23 of the at least two blades 5 that faces away from the rotating direction 20, wherein the at least one chamfer 35 runs in particular on the end of the respective blade 5 that faces an opening 32a, b. The flow properties of the side-channel compressor 1 can be improved by means of said chamfer 35, in particular when the gaseous medium which was set in motion in a circulating flow 24 flows from the side channel 19 back into the conveyor cell 28. When the gaseous medium flows from the side channel 19 back into the conveyor cell 28, turbulence formation and/or a flow breakdown can arise as the gaseous medium flows past the rear side 23 and the region of the blade 5 that faces the side channel 19. The reason therefor lies in that the probability of turbulence formation and/or a flow breakdown of the gaseous medium is increased between the rear side 23 and the region of the blade 5 that faces the side channel 19, in which at least one almost orthogonal edge is configured, this in turn leading to a reduced efficiency factor of the circulating flow 24 and thus of the side-channel compressor 1. The reason therefor lies in that the medium when flowing past the almost orthogonal edge has to perform an excessive change in direction, in particular in the region of a right angle, on account of which the formation of turbulence and/or a flow breakdown is facilitated. The angle of the edge is reduced on account of the configuration of the chamfer 35 on the rear side 23 of the blade 5, and the required change in direction of the medium flowing past is thus also reduced, on account of which the efficiency of the circulating flow 24 and of the side-channel compressor 1 can be improved.

In terms of the design embodiment of the side-channel compressor 1 according to the invention, having the at least one side-channel 19, it is moreover advantageous that the gaseous medium can continue to flow through the side channel 19 in the event of a defect of the side-channel compressor 1, even when the compressor wheel 2 is stationary and there is thus the risk that the conveying through the fuel cell system 37 by virtue of a defective side-channel compressor 1 leads to a complete breakdown. This is the case in particular when a high pressure and a high conveying rate of the medium to be conveyed in the fuel cell system are maintained, in particular by way of a further component of the fuel cell system.

Figure 6:
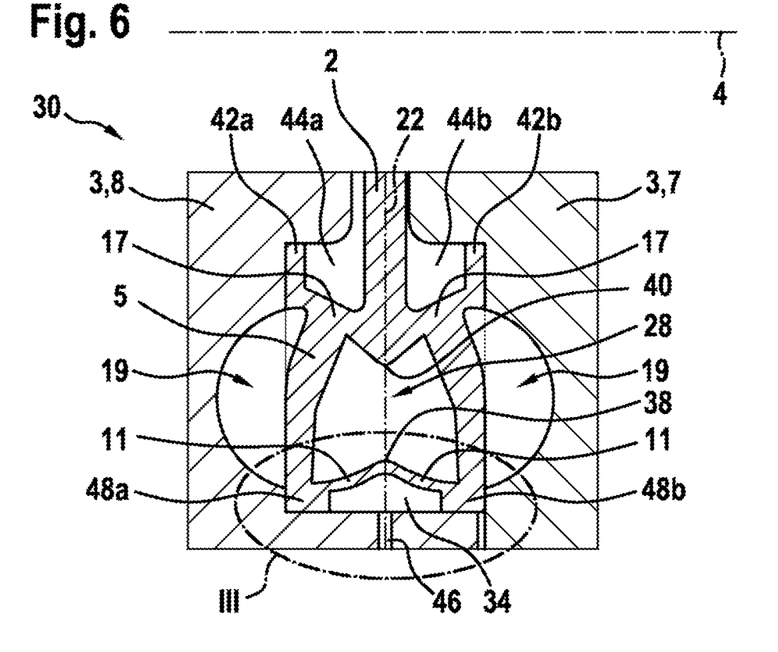
FIG. 6 shows a fragment of a compressor chamber, said fragment being identified by II in FIG. 1.

FIG. 6 shows a fragment of the compressor chamber 30, said fragment being identified by II in FIG. 1. The compressor wheel 2 which in the region of the outer delimitation ring 11 has at least one outside encircling annular bead 48*a, b* is shown herein. Said outside encircling annular bead 48*a, b* runs in an axial manner to the first symmetry axis 22 and on that side of the outer delimitation ring 11 that faces away from the rotation axis 4. The at least one outside annular bead 48*a, b* in an axial manner and/or radial manner to the first symmetry axis 22 herein bears on the housing upper part 7 and/or the housing lower part 8 of the housing 3.

Furthermore, the compressor wheel 2 in the region of the inner delimitation ring 17 has at least one inside encircling annular bead 42*a, b* which runs in particular in a radial manner to the rotation axis 4 and which runs on that side of the inner delimitation ring 17 that faces the rotation axis 4. Moreover, the at least one inside annular bead 42*a, b* in an axial manner and/or radial manner to the first symmetry axis 22 bears on the housing upper part 7 and/or the housing lower part 8.

Improved guiding of the compressor wheel 2 in the region of the conveyor cells 28 in the event of severe impacts and shocks during the operation of the side-channel compressor 1, for example by virtue of pressure peaks or a back pressure arising in the fuel cell system 37 can be achieved in that the compressor wheel by way of the at least one outside encircling annular bead 48*a, b* and the at least one inside annular bead 42*a, b* bears on the housing upper part 7 and/or the housing lower part 8. The stress on the bearings 27 and/or the drive 6 can be reduced on account thereof, since a majority of the impact forces, axial forces, and radial forces that arise in the operation of the side-channel compressor 1 can already be discharged into the housing 3 by way of the respective annular beads 42*a, b*, 48*a, b*.

It is moreover illustrated in FIG. 6 that an at least partially encapsulated separation chamber 34 is configured on that side of the outer delimitation ring 11 that faces away from the rotation axis 4 wherein the separation chamber 34 is in particular situated in a radial manner to the rotation axis 4, between the outer delimitation ring 11 and the housing upper part 7 and/or the housing lower part 8. Furthermore, the separation chamber 34 is configured so as to at least partially encircle the rotation axis 4 between the housing 3 and the outer delimitation ring 11. On account of the configuration of said separation chamber 34 it is possible that the heavy component parts can be discharged from the gaseous medium and be collected in said separation chamber 34. The heavy component parts are thus dissipated away from the region of the at least one side channel 19 and the conveyor cell 28 and collected in the region of the separation chamber 34. Said heavy component parts of the gaseous medium can be, for example, undesirable waste products and/or byproducts from the operation of the fuel cell system 37, such as for example nitrogen or water. The conveying and compressing effect of the side-channel compressor 1 can be increased by discharging the heavy component parts, since the proportion of the gaseous medium to be conveyed, in particular hydrogen which is required for generating the electric current in the fuel cell 39, is increased in the conveyor cell 28 and the side channel 19. On account thereof, the efficiency ratio of the side-channel compressor 1 can be increased since to heavy component parts which are undesirable in the operation have to be conjointly conveyed.

It is furthermore illustrated in FIG. 6 that an at least partially encapsulated region 44*a, b* is configured on that side of the inner delimitation ring 17 that faces the rotation axis 4, wherein the at least one encapsulated region 44*a, b* is situated between the at least one inside encircling annular bead 42*a, b* and the housing upper part 7 and/or the housing lower part 8. It is advantageous herein that it is prevented on account of the at least one annular bead 42*a, b* that the gaseous medium from the regions of the side channel 19, the conveyor cell 28, and the separation chamber 34 invades the encapsulated region 44*a, b*. On account thereof it is furthermore prevented that the components, i.e. the drive 6 and/or the bearings 27 and/or the drive shaft 9, which are situated in the encapsulated region 44 are damaged. In the case of the electric drive 6, an invasion of the heavy component part water or hydrogen can lead to electrical shorting and/or to damage to the electrical or magnetically soft components of the drive 6. This can restrict the operation of the entire side-channel compressor 1 and even lead to a failure.

Figure 7:
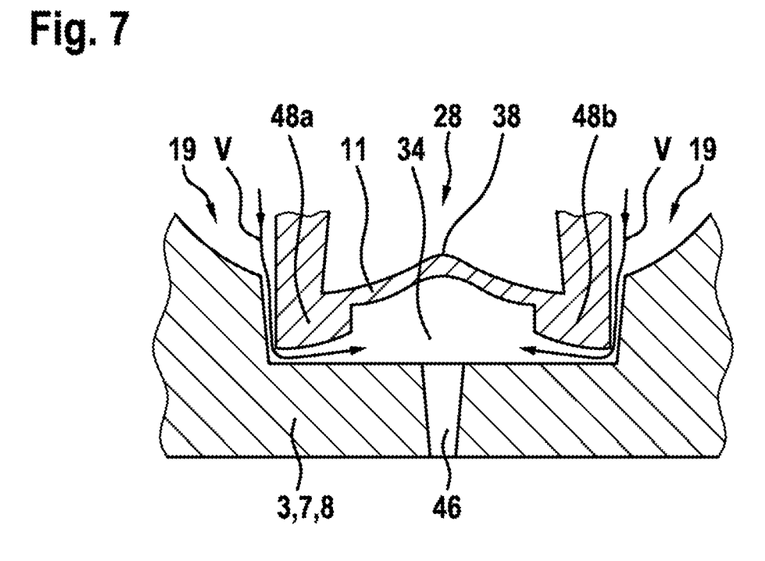
FIG. 7 shows a fragment of the encapsulated side-channel compressor according to the invention, said fragment being identified by III in FIG. 6.

FIG. 7 shows a fragment of the encapsulated separation chamber 34, said fragment being identified by III in FIG. 6. It is illustrated herein on which path and in which way the heavy component parts of the gaseous medium are discharged from the region of the at least one side channel 19 and/of the conveyor cell 28 and are fed to the region of the separation chamber 34.

It is furthermore shown in FIG. 7 that a discharge channel 46 is situated on that side of the encapsulated separation chamber 34 that faces away from the rotation axis 4 in the housing upper part 7 and/or in the housing lower part 8 and/or between the housing upper part 7 and the housing lower part 8. The discharge channel 46 herein is disposed on the lowest point, in particular on the geodetically lowest point, in the housing 3, in particular in the acting direction of gravity. The formation of liquid water on account of condensation from the gaseous medium can arise in the region of the side channel 19 and/or of the conveyor cell 28 in the operation of the side-channel compressor 1. The water and/or other heavy component parts, such as for example nitrogen, conjointly with the gaseous medium herein are accelerated and set in motion in the direction of the rotating direction 20 on account of the rotation of the compressor wheel 2 and of the conveyor cell 28. Higher centrifugal forces in a radial manner to the rotation axis 4 act on the water than on the gaseous medium herein, on account of which a centrifugal separation takes place and the water from the side channel 19 in the discharge direction V moves between the housing 3 and the outside annular bead 48*a, b* of the compressor wheel through to the separation chamber 34. In addition to the heavy component part water, further heavy component parts, such as for example nitrogen, can also be discharged. The additional discharge channel 46 which in turn could be connected to a water separator of the fuel cell system 37, so as to thus dissipate the liquid water from the side-channel compressor 1, is advantageously situated at the geodetically lowest point of the separation chamber 34.

It is advantageous herein that automatic dissipating in an outward manner through the discharge channel 46 without requiring any further measure such as, for example, mechanical pumping, takes place herein on account of the effect of gravity and/or the centrifugal force on the heavy component parts of the gaseous medium that are collected in the separation chamber 34. The effect of the automatic dissipation of the heavy component parts in an outward manner by way of the discharge channel 46 is also reinforced in that heavy component parts continue to flow into the separation chamber 34 in the operation of the side-channel compressor 1, and on account thereof push the heavy components parts already in situ through the discharge channel 46.

This moreover offers the advantage that the heavy component parts are discharged from the region of the conveyor cell 28 and of the side channel 19, on the one hand, and from the fuel cell system 37 by way of the discharge channel 34 can also be discharged from the region of the separation chamber 34 on the other hand. The risk of damage to the rotating components, in particular to the compressor wheel 2 or to the bearings 27, is prevented on account thereof, since remaining heavy components, such as for example water, in the switched-off state of the fuel cell system 37 and at low ambient temperatures can lead to the formation of ice bridges which can damage said components when starting the side-channel compressor 1. This damage is prevented by dissipating the heavy component parts by way of the discharge channel 46. By directing the heavy component parts such as liquid water in particular out of the region of the compressor chamber, the advantage that ice bridges are prevented from forming between the movable parts, in particular the compressor wheel and the housing, in the switched-off state of the fuel cell system and at low ambient temperatures, is furthermore achieved. Ice bridges of this type would impede or completely prevent starting of the fuel cell system, in particular of the side-channel compressor. Damage to the rotating parts of the of the side-channel compressor and/or of a drive, in particular an electric drive, by virtue of the formation of ice bridges can thus be prevented on account of the design embodiment of the side-channel compressor according to the invention. A reliable cold-start capability of the side-channel compressor can be guaranteed on account thereof, even in the event of a long stationary period and at low outside temperatures, in particular below 0° Celsius.

The invention is not limited to the exemplary embodiments described herein and the aspects highlighted herein. Rather, a multiplicity of modifications which are within the scope of a person skilled in the art are possible within the range set forth by the claims.

What is claimed is:

1. A side-channel compressor (1) for a fuel cell system (37) for conveying and/or compressing a gas, the side-channel compressor comprising
a housing (3), wherein the housing (3) has a housing upper part (7) and a housing lower part (8),
a compressor chamber (30) which is situated in the housing (3) and which has at least one encircling side channel (19),
a compressor wheel (2) which is situated in the housing (3) and which is disposed so as to be rotatable about a rotation axis (4), wherein the compressor wheel (2) on a circumference thereof has blades (5) which are disposed in the region of the compressor chamber (30), and
a gas inlet opening (14) and a gas outlet opening (16) which are in each case configured on the housing (3) and which by way of the compressor chamber (30) are fluidically connected to one another,
wherein the compressor wheel (2) on the circumference thereof has an encircling outer delimitation ring (11) which runs about the compressor wheel (2) so as to be rotationally symmetrical to the rotation axis (4)
wherein at least two blades (5) each define a respective conveyor cell (28), and wherein each of the at least two blades (5) on a side of the outer delimitation ring (11) that faces the rotation axis (4) have a first guide contour (38) which in cross section converges so as to form a tip extending into the respective conveyor cell (28), and/or on a side of an inner delimitation ring (17) that faces away from the rotation axis (4) have a second guide contour (40) which in cross section converges so as to form a tip extending into the respective conveyor cell (28), wherein an axis of symmetry (22) runs through the respective conveyor cell (28) of the at least two blades (5) and runs through the tips of the first and/or the second guide contours (38, 40),
wherein the compressor wheel (2) on the outer delimitation ring (11) has at least one outside encircling annular bead (48a, b) which runs radially with respect to the rotation axis (4), and wherein the outside annular bead (48a, b) runs on the side of the outer delimitation ring (11) that faces away from the rotation axis (4),
wherein the at least one outside encircling annular bead (48a, b) in an axial manner and/or radial manner to the rotation axis (4) abuts the housing (3),
wherein an at least partially encapsulated separation chamber (34) is configured on a side of the outer delimitation ring (11) that faces away from the rotation axis (4), and
wherein a discharge channel (46) is situated on a side of the encapsulated separation chamber (34) that faces away from the rotation axis (4) in the housing lower part (8) and runs so as to at least partially encircle the rotation axis (4) between the housing (3) and the outer delimitation ring (11).

2. The side-channel compressor (1) as claimed in claim 1, characterized in that each conveyor cell (28) is further defined on the compressor wheel (2) in a region of the compressor chamber (30) between in each case two neighboring blades (5), in each case the conveyor cell (28) in a radial manner to the rotation axis (4) is outwardly delimited by the outer delimitation ring (11), and inwardly is delimited by the encircling inner delimitation ring (17) of the compressor wheel (2), wherein the conveyor cell (28) in the direction of the rotation axis (4) has at least one opening (32a, b).

3. The side-channel compressor (1) as claimed in claim 2, characterized in that the at least one opening (32a, b) is configured on a side of the conveyor cell (28) of the compressor wheel (2) that faces the at least one side channel (19) of the housing (3).

4. The side-channel compressor (1) as claimed in claim 2, characterized in that at least two blades (5) have in each case a symmetrical V-shaped contour, wherein the symmetrical V-shaped contour between two openings (32a, b) runs in the direction of the rotation axis and wherein the opened side of the symmetrical V-shaped contour is directed in a rotation direction (20) of the compressor wheel (5).

5. The side-channel compressor (1) as claimed in claim 4, characterized in that at least one chamfer (35) is in each case configured on a rear side (23) of the at least two blades (5) that face away from the rotating direction (20).

6. The side-channel compressor (1) as claimed in claim 4, characterized in that at least one chamfer (35) is in each case configured on a rear side (23) of the at least two blades (5) that face away from the rotating direction (20), wherein the at least one chamfer (35) runs on the end of the respective blade (5) that faces the at least one opening (32a, b).

7. The side-channel compressor (1) as claimed in claim 1, characterized in that the discharge channel (46) is situated at a lowest point in the housing lower part (8).

8. The side-channel compressor (1) as claimed in claim 1, wherein the gas inlet opening (14) and the gas outlet opening (16) are fluidically connected to one another by way of the at least one side channel (19).

9. The side-channel compressor (1) as claimed in claim 1, characterized in that the compressor wheel (2) on the inner delimitation ring (17) has at least one inside encircling annular bead (42a, b) which runs so as to be radial to the rotation axis (4), and which runs on the side of the inner delimitation ring (17) that faces the rotation axis (4).

10. The side-channel compressor (1) as claimed in claim 1, characterized in that the separation chamber (34) is situated in a radial manner to the rotation axis (4), between the outer delimitation ring (11) and the housing upper part (7) and/or the housing lower part (8).

11. The side-channel compressor (1) as claimed in claim 1, characterized in that the gas is hydrogen.

12. The side-channel compressor (1) as claimed in claim 1, characterized in that each of the at least two blades (5) on the side of the outer delimitation ring (11) that faces the rotation axis (4) have the first guide contour (38) which in the cross section converges so as to form the tip extending into the respective conveyor cell (28), and on the side of the inner delimitation ring (17) that faces away from the rotation axis (4) have the second guide contour (40) which in the cross section converges so as to form the tip extending into the respective conveyor cell (28),
wherein the respective conveyor cell (28) extends between the tips of the first and second guide contours (38, 40), and
wherein the first symmetry axis (22) runs through the tips of the first and the second guide contours (38, 40) and runs through the respective conveyor cell (28) of the at least two blades (5).

13. The side-channel compressor (1) as claimed in claim 12, wherein the at least one outside encircling annular bead (48a, b) in an axial manner and radial manner to the rotation axis (4) abuts the housing (3).

14. The side-channel compressor (1) as claimed in claim 1, characterized in that each of the at least two blades (5) on the side of the outer delimitation ring (11) that faces the rotation axis (4) have the first guide contour (38) which in the cross section converges so as to form the tip extending into the respective conveyor cell (28),
wherein the first symmetry axis (22) runs through the tip of the first guide contour (38) and runs through the respective conveyor cell (28).

15. The side-channel compressor (1) as claimed in claim 1, characterized in that each of the at least two blades (5) on the side of the inner delimitation ring (17) that faces away from the rotation axis (4) have the second guide contour (40) which in the cross section converges so as to form the tip extending into the respective conveyor cell (28),
wherein the first symmetry axis (22) runs through the tip of the second guide contour (40) and runs through the respective conveyor cell (28).

16. The side-channel compressor (1) as claimed in claim 1, wherein the at least one outside encircling annular bead (48a, b) in an axial manner and radial manner to the rotation axis (4) abuts the housing (3).

17. The side-channel compressor (1) as claimed in claim 1, wherein the at least one outside encircling annular bead (48a, b) in an axial manner to the rotation axis (4) abuts the housing (3).

18. The side-channel compressor (1) as claimed in claim 1, wherein the at least one outside encircling annular bead (48a, b) in a radial manner to the rotation axis (4) abuts the housing (3).

19. The side-channel compressor (1) as claimed in claim 1, characterized in that the compressor wheel (2) on the inner delimitation ring (17) has at least one inside encircling annular bead (42a, b) which runs on the side of the inner delimitation ring (17) that faces the rotation axis (4).

20. The side-channel compressor (1) as claimed in claim 19, characterized in that the at least one inside encircling annular bead (42a, b) in an axial manner and/or radial manner to the rotation axis (4) bears on the housing upper part (7) and/or the housing lower part (8).

21. The side-channel compressor (1) as claimed in claim 19, characterized in that an at least partially encapsulated region (44) is configured on the side of the inner delimitation ring (17) that faces the rotation axis (4).

22. The side-channel compressor (1) as claimed in claim 19, characterized in that an at least partially encapsulated region (44) is configured on the side of the inner delimitation ring (17) that faces the rotation axis (4), wherein the at least one encapsulated region (44) is situated between the at least one inside annular bead (42) and the housing upper part (7) and/or the housing lower part (8).

* * * * *